(12) United States Patent (10) Patent No.: US 7,686,035 B2
Goinski (45) Date of Patent: Mar. 30, 2010

(54) DEVICE FOR DIVISION OF A NON-NEWTONIAN LIQUID FLOWING THROUGH A PASSAGE

(75) Inventor: Michael Goinski, Rodgau (DE)

(73) Assignee: Incoe Corporation, Troy, MI (US)

( * ) Notice: Subject to any disclaimer, the term of this patent is extended or adjusted under 35 U.S.C. 154(b) by 1236 days.

(21) Appl. No.: 11/162,438

(22) Filed: Sep. 9, 2005

(65) Prior Publication Data

US 2006/0054222 A1 Mar. 16, 2006

(30) Foreign Application Priority Data

Sep. 11, 2004 (DE) ........................ 10 2004 043 949

(51) Int. Cl.
*F16L 41/00* (2006.01)
(52) U.S. Cl. .................................... 137/561 A; 137/861
(58) Field of Classification Search ............. 137/561 A, 137/561 R, 861, 872
See application file for complete search history.

(56) References Cited

U.S. PATENT DOCUMENTS

RE32,880 E * 2/1989 Lapeyre ........................ 251/46

5,499,652 A * 3/1996 Schnaus et al. ......... 137/561 A

* cited by examiner

*Primary Examiner*—John Rivell
*Assistant Examiner*—Andrew J Rost
(74) *Attorney, Agent, or Firm*—Butzel Long

(57) ABSTRACT

A device for division of a non-Newtonian liquid, for example a molten synthetic material, flowing through a passage (1, 21), and comprising a flow-conditioned viscosity decreasing outward in cross section in flow through a T-shaped passage branching (T) deflecting and dividing the liquid flow. In a first embodiment of the device, before the end of the supply passage (1), a partition (11) is installed in the passage branching (T) dividing the liquid counterflow from the supply passage (1) into two halves, the angular position of the partition (11) assuming a setting adapted to the distribution of the differentially viscous components of the liquid in the supply passage (1). In a second embodiment of the device, in the passage branching (T), a deflector (23) is installed, so fashioned that essentially the central (viscous) component of the liquid from the supply passage (21), prior to its deflection into the discharge passages (22a, 22b), is divided into two components and these are so deflected that the two components preferably flow diametrally towards each other in the region ahead of the discharge passages (22a, 22b).

9 Claims, 5 Drawing Sheets

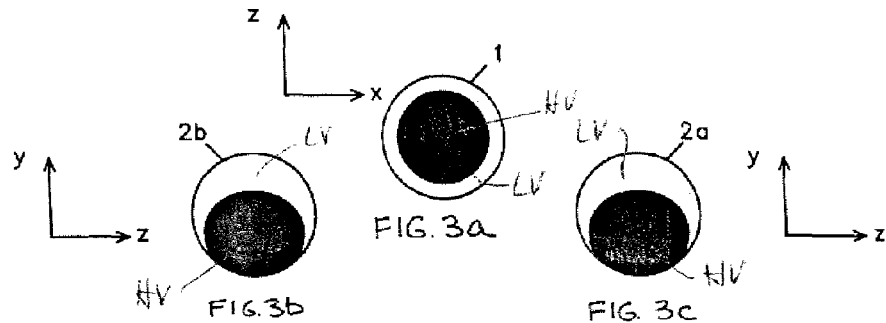
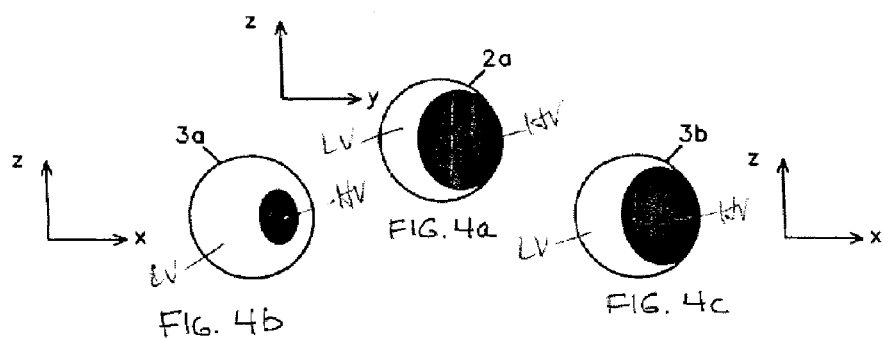
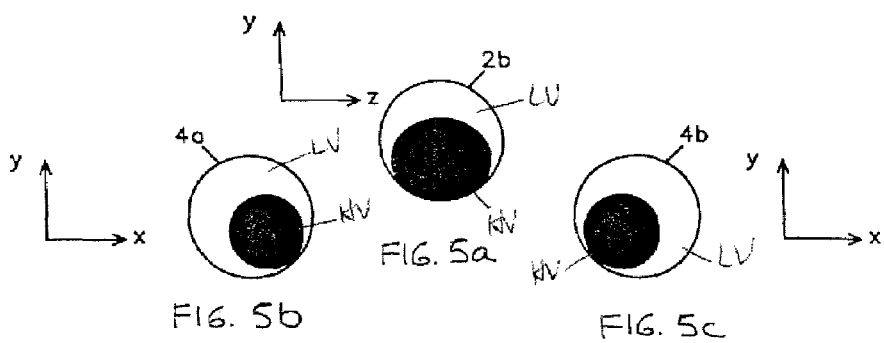
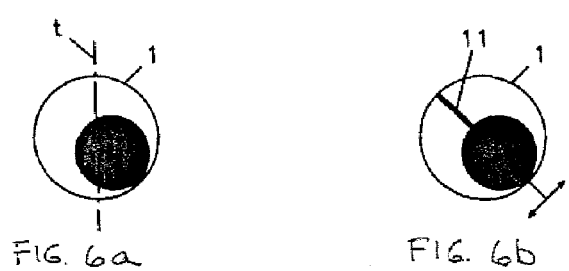

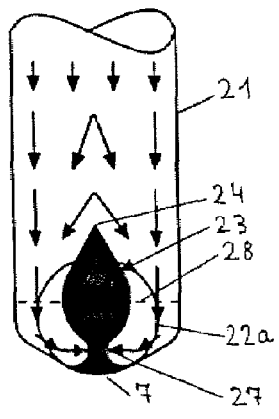
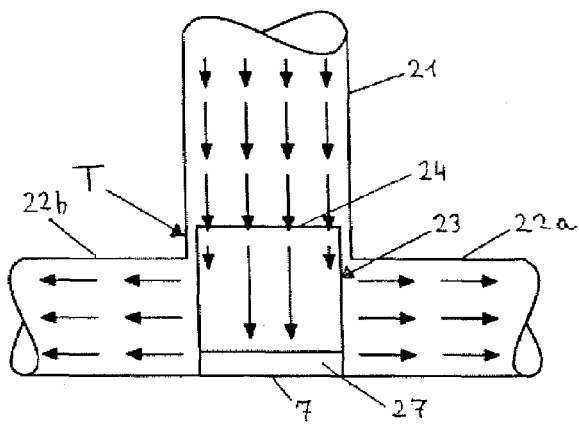
Fig. 9a               Fig. 9b
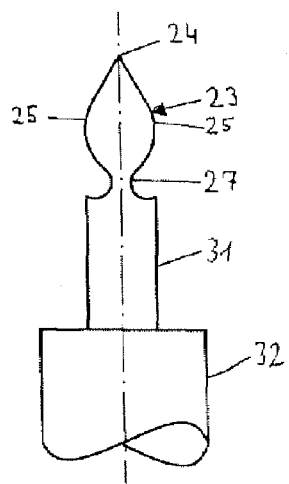
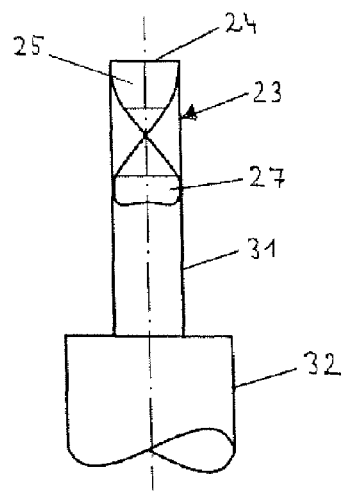
Fig. 10a              Fig. 10b

DEVICE FOR DIVISION OF A NON-NEWTONIAN LIQUID FLOWING THROUGH A PASSAGE

TECHNICAL FIELD

The present invention relates to a device for targeted division of a non-Newtonian liquid flowing through a passage.

BACKGROUND OF THE INVENTION

In injection molding, molten synthetic materials (such as thermoplastic materials) are passed, for example, through a hot passage manifold system in which there are branches at certain points, into which the molten material supplied in one passage is divided between two discharge passages. These branchings are predominantly of T-shaped configuration.

In the case of a Newtonian liquid flowing through a circular passage, a parabolic flow velocity distribution of the liquid, subdivided into imaginary concentric hollow cylindrical layers sets in, the flow velocity being a maximum in the center of the passage. In such a liquid, the shear between the several imaginary hollow cylindrical layers of the liquid is approximately equal.

On the other hand, a non-Newtonian liquid, such as for example (hot) liquid plastic, behaves differently. In this case, the viscosity is dependent on the shear, which is a maximum near the wall of the circular passage. The less the viscosity, the greater the shear. As a result, the viscosity near the wall of the circular passage is at a minimum. The viscosity distribution of the melt over the cross section resembles a sharply flattened parabola. In a simplified approximate view, this means that in the central region of the passage, the relatively viscous flowing melt behaves like a plug, with a flow velocity approximately independent of the radial location, whereas in the peripheral region the melt is more fluid, owing to the greater shear, and flows more slowly.

This behavior is illustrated in FIGS. 1a-1c. FIG. 1a shows a circular passage through which a non-Newtonian liquid flows, for example a plastic melt. FIG. 1b shows the distribution of the flow velocity "V" over the cross section, and FIG. 1c shows that of the shear. The region "d" corresponds more or less to the aforementioned plug.

If a non-Newtonian liquid flow of the type shown in FIG. 1 is diverted in a rectangular (T-shaped) branching T1 of the passage and divided into two separate flows S1 and S2, as shown in FIG. 2, then the high-viscosity portion and the fluid portion of the liquid will be distributed over the cross section of the passage. The distribution over the cross-section is shown in FIGS. 3a-3c where area HV represents the liquid of high viscosity and the remaining area LV represents the liquid of low viscosity. On the coordinate system drawn in FIGS. 2 to 5, the coordinates x and y lie in the plane of the drawing and the coordinate z runs perpendicular to the plane of the drawing. Thus, the high-viscosity HV portion of the non-Newtonian liquid will collect substantially in the lower portion (in the sense of the drawing) of the passage segments 2a and 2b shown in FIG. 2. This is easily seen, since the viscous fluid (melt) supplied from the central region of the passage segment 1 will advance to the bottom 6 of the Tee, and only then be deflected to the left and right in the sense of FIG. 2, as indicated by the arrows "a" in FIG. 2, while the more fluid liquid flowing in the peripheral region of the passage 1 will be deflected at the very beginning of the branching of the passage, as indicated by the arrows "b".

If the passage segments 2a and 2b shown in FIG. 2 were very long, then gradually the natural distribution shown in FIG. 3a would gradually be reestablished. In practice, however, the passage segments are short, so that approximately the distribution shown in FIGS. 3b and 3c would be preserved as far as the next deflection in a Tee.

If the liquid flowing in the passage segment 2a encounters the Tee T2, whose lengthwise axis runs in y-direction, the distribution shown in FIG. 4 establishes itself in the discharge passages 3a and 3b. The view here is in flow direction of the discharge passage in question. In the discharge passages, we see a marked inequality of viscous and fluid portions as well as a marked asymmetry of these portions with respect to the centers of the passages.

The Tee T3 in FIG. 2 has two discharge passages 4a and 4b running perpendicular to the plane of the drawing (in z-direction). See FIG. 2a, which shows a top view of this portion of FIG. 2. After deflection in this Tee T2, the separations of viscous and fluid portions of the liquid as shown in FIGS. 5a and 5b result. In the discharge passage 4b emerging upward from the plane of the drawing in FIG. 2, the distribution according to FIG. 5c is established, and in the passage 4b entering the plane of the drawing in FIG. 2, the distribution according to FIG. 5b is established, the view being again defined by the Tee in flow direction of the discharge passage.

In injection molding, if the injection nozzles connected to an injection molding tool (mold) are supplied from passages in which the quantity distribution of melt components of different viscosity is unequal (for example FIGS. 4b and 4c), and/or in which the distribution of the melt is no longer rotationally symmetrical with respect to the longitudinal axis of the passage (for example FIGS. 3b and 5b), this may lead to defects in the cast injection molding products.

If we assume that a plate is injected by way of a plurality of nozzles distributed over the area of the plate, the following defects may occur.

If the portion of the fluid melt from the nozzles in the outer region of the plate is greater than from the nozzles in the inner region of the plate, then under the instant pressure of the entering melt, more melt will be forced into the injection tool (injection mold) in the outer region of the plate than in the middle region. This means that the plate will be supplied with more material per unit area in the outer region than in the inner region, with the result that the cast plate will comprise undular edges. If, conversely, more fluid melt is forced into the injection mold in the inner region, then after cooling of the melt, the greater quantity of melt per unit area in the interior will lead to a bulging of the plate in the inner region.

Similar situations, though less troublesome, arise if the melt portions in the passage segments supplying the nozzle are distributed asymmetrically.

If, for example, each of the several injection nozzles of a hot passage manifold system injects a cup, then the unequal quantity distribution of viscous and fluid melt among various nozzles has the result that the cups will have different wall thicknesses. An asymmetrical distribution of the melt components may lead to that side of the cup which contains preferentially fluid melt becoming thicker than the opposed side of the cup, resulting in a bulged cup, and/or, where viscous melt enters into the mold, it does not get to the bottom of the mold.

SUMMARY OF THE INVENTION

An object of the present invention is to develop devices by which the asymmetrical and/or unequal quantity distribution of liquid components of different viscosity due to the deflections described are minimized or eliminated insofar as possible, and/or their occurrence prevented.

To accomplish this object, a first embodiment of a device for targeted division of a non-Newtonian liquid, for example a molten synthetic material flowing through a passage (1) is provided. The material has viscosity decreasing outward in cross section in flow through a T-shaped passage branching (T) which deflecting and dividing the liquid flow. A partition is positioned in the passage branching (T) which divides the liquid flowing counter from the supply passage segment (1) into two halves. The angular position of the partition (11) preferably has a setting adapted to the distribution of the differentially viscous components of the liquid in the supply passage segment (1). With the invention, a division of the liquid between the discharge passages (2a, 2b) of the passage branching (T) is accomplished without a significant distribution of the differentially viscous components of the liquid.

With this embodiment of the invention, it is brought about that when in the supply passage segment of a preferably or substantially T-shaped passage branching, the melt components of different viscosity are not rotationally symmetrically distributed. Instead, in two discharge passage segments of the passage branches, the proportion of the melt components of different viscosity is substantially equal.

In a second embodiment of the invention, a deflector is provided to divide the flow of the material.

In this second form of the device, in the supply passage segment of a preferably or substantially T-shaped passage branching, the quantity distribution of the melt components of different viscosity is rotationally symmetrical. In the two discharge passage segments of the passage branching, essentially the rotationally symmetrical distribution is preserved and also the proportion of the melt components of different viscosity in the two discharge passages is substantially equal. The distribution pattern in the discharge passage segment is thus essentially the same as that in the supply segment.

The discharge passages may have the same cross section as the supply passage, so that the flow velocity in the discharge passages is reduced to half; alternatively, however, they may have smaller cross sections, so that the flow velocity is less sharply reduced or not at all.

BRIEF DESCRIPTION OF THE DRAWINGS

In the following, the invention will be illustrated in terms of embodiments by way of example and in terms of additional figures.

FIGS. 3a-3c show the distribution of the at first symmetrical distribution of the viscous and fluid liquid components behind a first channel branching T1, FIGS. 4a-4c show the distribution to which the melt continuing to flow on from the first passage branching T1 is subjected by a passage branching T2 in the same plane as the passage branching T1 previously passed, FIG. 5a-5c show the corresponding distribution as in FIG. 4 at a subsequent passage branching T3 lying in a plane perpendicular to the passage branching T1 previously passed, FIGS. 6a and 6b illustrate a first embodiment of the invention by way of example having in principle the structure of the first form of a device.

FIGS. 10a and 10b show a practical example of an embodiment of the deflector in FIGS. 9a and 9b in two views at right angles to each other, to an enlarged scale, supplemented by a fastening part.

DESCRIPTION OF THE PREFERRED EMBODIMENTS

FIGS. 6a and 6b show an embodiment by way of example having the structure, in principle, of a first type of device according to the invention. In the passage branching, a partition 11 directed at the supply melt is so installed that it divides the flow of melt coming from the supply passage segment 1. Here, the partition 11 is placed at such an angle of rotation that it parts the approaching melt, in which the liquid components of different viscosity are not distributed rotationally symmetrical with respect to the longitudinal axis of the passage, in such manner that the two partial flows contain equal quantities of liquid components of different viscosity.

If it is assumed that in the absence of the partition 11, the melt would distribute itself between the discharge passages in correspondence to the line "t" shown in FIG. 6a, then a partition 11 placed in the angular position shown in FIG. 6b can part the approaching melt in such manner that the same proportion of viscous and fluid liquid is supplied to the two discharge passages. The partition 11 may be arranged in the passage branching in suitable manner with fixedly adjusted or adjustable angular position.

Figures 1A, 1B, 1C:
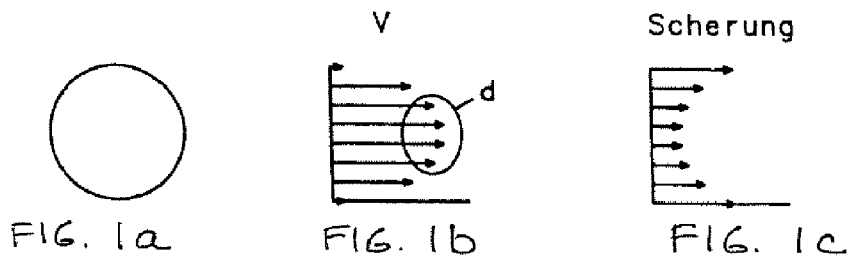
FIGS. 1a-1c show the flow situation of a non-Newtonian liquid in a cylindrical passage.
Figure 2:
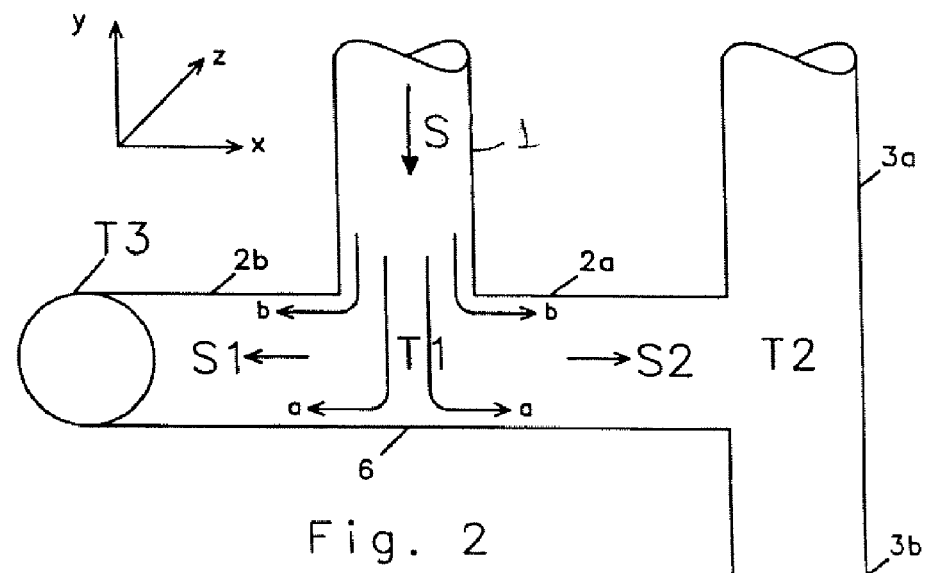
FIG. 2 shows a passage manifold system having three T-shaped passage branchings.
Figure 2A:
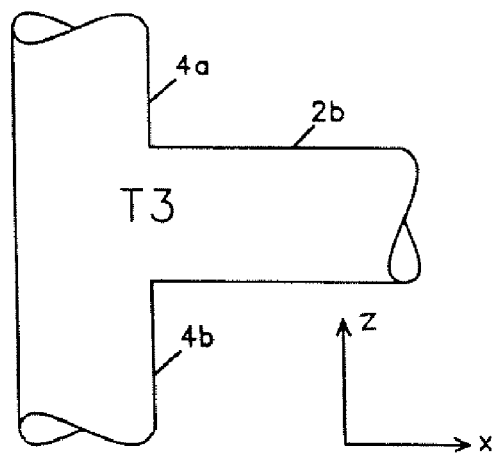
FIG. 2a shows a portion of FIG. 2, in top view.
Figure 7:
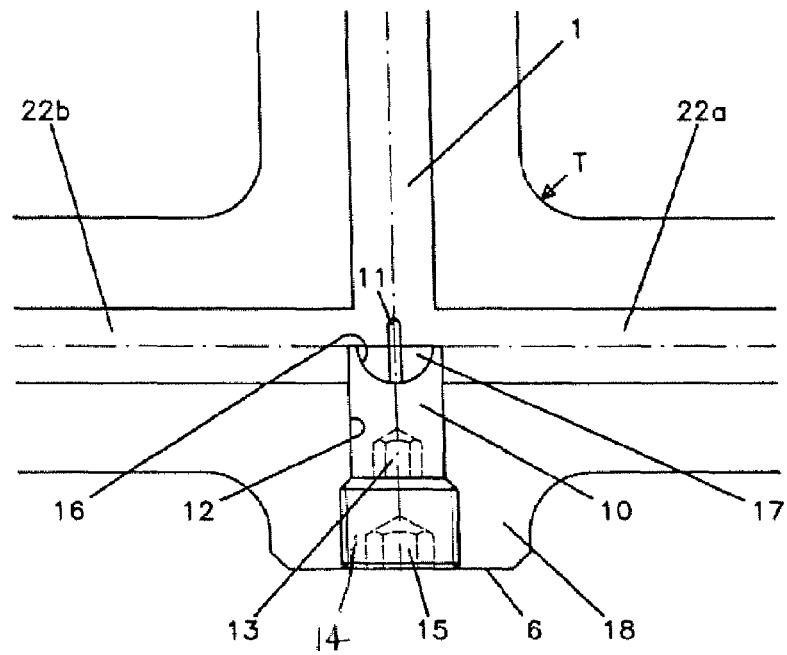
FIG. 7 shows a practical example of the first type of embodiment of a device according to FIG. 6, built into a T-shaped passage branching.

A practical embodiment of such a device according to the invention is shown in FIGS. 7 and 8, by way of example. In FIG. 7, starting from the bottom 6 of the T-shaped passage branching, a bore 12 is made in the Tee. Into this bore 12, a partition plug 10 to which a partition 11 is rigidly attached, is pressed in as far as the middle of the discharge passage segments 22a, 22b. Here, the partition plug, for example by means of a hexagonal socket 13, is rotated into the desired angular position, as was illustrated by FIG. 6b. To prevent the plug 1 0 from being pushed out under pressure in service, it is fixed in its axial position by a screw plug 14, which may be screwed into the bore 12 for example by means of a hexagonal socket 15. The plug 10 is preferably a solid body, having a dome-shaped recess 16 at its end near the partition 11, in which the partition 11 is rigidly fixed in any manner by its side facing away from the supply passage segment 1. The requisite angular position of the partition 11 is determined by the rotational position with which the partition plug 10 is inserted in the bore 12. The retention of this angular position is achieved in any conventional manner, such as by a press fit, or by any other additional suitable rotational security.

Expediently, after the plug as previously described has been installed in the passage branching, the partition plug 10 starting from the discharge passages 22a and 22b is bored to the diameter of the discharge passages in the region of the dome-shaped recess 16, forming the (in projection) semicircular flow openings 17. Of course, these flow openings might instead be provided prior to installation on the partition plug.

In FIG. 7, for clarity, the partition 11 is represented in an angular position perpendicular to the plane of the drawing, and the openings 17 formed by the boring are represented as lying in the plane of the drawing. It will be understood that in reality these flow openings 17 lie rotated 90°, while the angular position of the partition 11 assumes an angular position in relation to the plane of the drawing, as shown in FIG. 6b, adapted to the distribution of the liquid components of different viscosity in the supply passage 1.

In FIG. 7, the bottom 6 of the passage branching is shown with a reinforcement 18. This is required only when a commercial Tee, or the wall of a hot passage manifold block in which the flow passages are worked has an insufficiently thick wall.

Figures 8A, 8B:
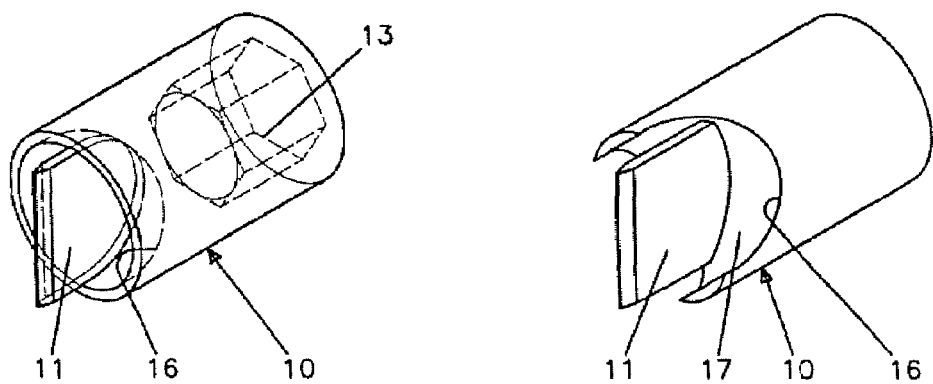
FIGS. 8a and 8b, in perspective representation, show a practical example of an embodiment of the partition plug employed in FIG. 7, FIGS. 9a and 9b, in perspective representation, show a practical example of the second type of embodiment of a device according to the invention, built into a T-shaped passage branching, in two sections at right angles to each other.

FIGS. 8a and 8b show two perspective representations of the previously described example of the solid partition plug 10 with partition 11. FIG. 8a shows the plug 10 before boring the dome-shaped recess 16, with indication of the rear hexagonal socket 13. FIG. 8b shows the plug with the bores to be expediently made after installation and the resulting flow openings 17.

In a second embodiment of a device according to the present invention, the aim pursued is so to divide and deflect a flow of liquid with symmetrical distribution of the liquid components of different viscosity according to FIG. 3a in a passage branching that this distribution is substantially preserved in the discharge passages of the passage branching.

If in FIG. 9b it is assumed that the liquid in the supply passage segment 21 is distributed according to FIG. 3a, then the distribution in the discharge passage segments 22a and 22b will correspond to FIGS. 3b and 3c without more. But if one were to supply an equal flow of liquid to that supplied by the pipe 21 to the passage branching from above in the sense of the drawing, and additionally from below as well, it is easily seen that the viscous liquid component forced aside in FIG. 9b into the passages 22a and 22b would be shifted by the supposed additional liquid flow towards the center of the passages 22a and 22b.

This effect is realized by the second type of device according to the invention with an ordinary passage branching. In the second type of a device according to the invention, the viscous liquid component flowing in the center of the supply passage segment is divided, and the two components are deflected to meet each substantially at right angles at the entrances of the discharge passage segments, their direction of flow at this encounter being essentially perpendicular to the longitudinal direction of the discharge passages.

To accomplish this, in the passage branching there is a deflector 23, so fashioned that it enters into the supply passage segment 21 with a blade 24, and essentially splits the viscous liquid component flowing in the center of the passage segment 21 into two components, one continuing to flow on the left and the other on the right side of the deflector 23. These components are deflected so they meet each other insofar as possible at right angles at the bottom end 7, in the sense of the drawing, of the passage branching.

The web 27 on whose sides the two components of the viscous component impinge serves only for mechanical attachment of the deflector 23 in the passage branch. For the effect according to the invention, it is not required. The actual deflector 23 preferably touches the passage segment 21 nowhere on its entire periphery.

FIGS. 10a and 10b show a practical embodiment of the deflector 23. The said web 27 is adjoined by a cylindrical segment 31 which may continue in a cylindrical segment 32 of enlarged diameter. With said segment 31, the deflector is thrust as far as the position shown in FIGS. 9a and 9b and sealingly fastened, through a bore in the bottom of the passage branching.

In principle, any kind of fastening of the deflector 23 in the passage branching will suffice, for example by means of the struts 28 shown dotted in FIG. 9a, although this might be difficult with passages of small diameters.

The deflector 23 with web 27 and cylindrical segment 31 may be made out of a continuous cylindrical body, provided at its anterior end with the blade 24 and at its posterior end with a constriction forming the web 27 by notches on both sides, opposed to each other and parallel to the blade 24. The opposed sides 25 of the deflector preferably lie on circularly or similarly curved surfaces extending from the blade 24 to the web 27 and making a transition into surfaces of the original cylinder 31.

Figure 11:
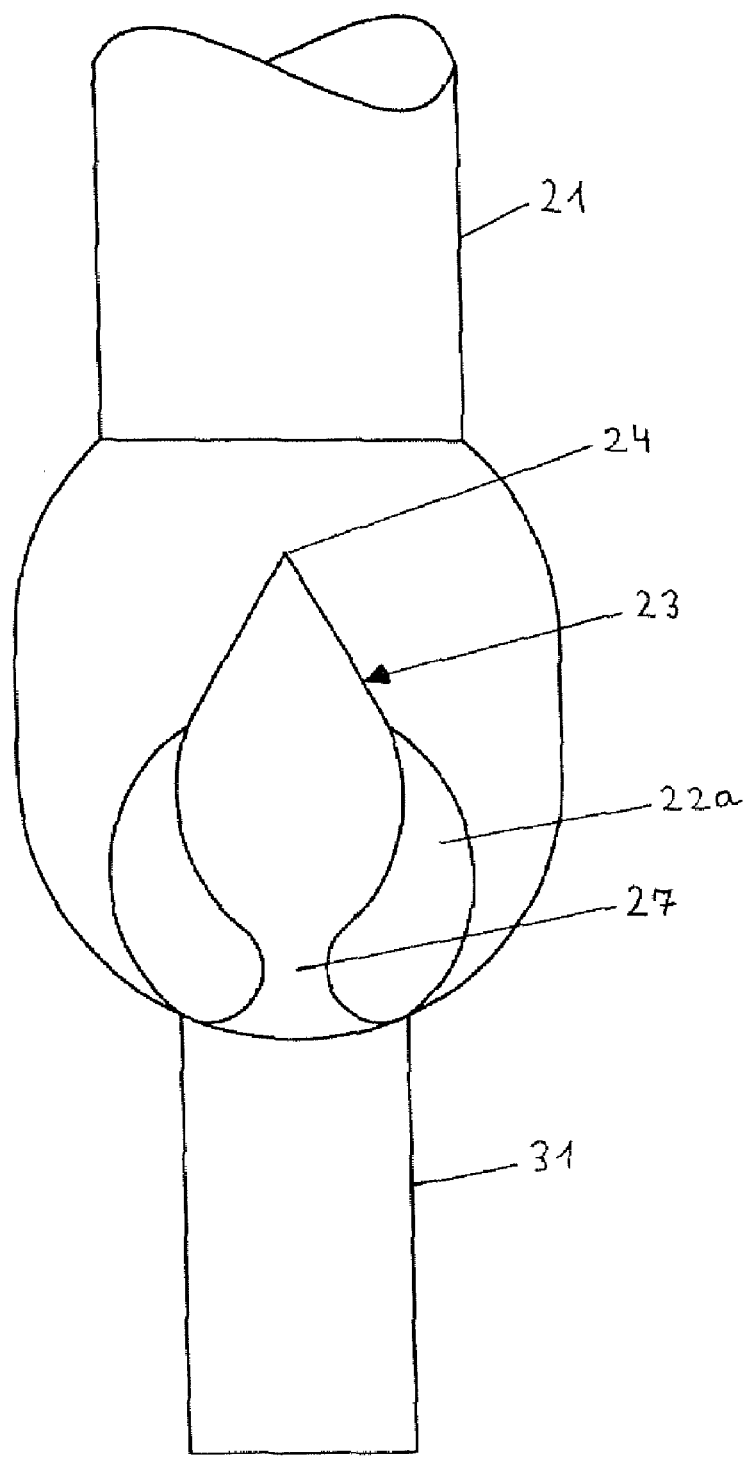
FIG. 11 shows a deflector according to FIG. 10 as installed in a Tee.

FIG. 11 shows a deflector of the type of FIG. 11 as installed in a T-shaped passage branching. Insofar as the reference numerals in FIG. 11 correspond to those in FIGS. 9 and 10, they designate the same objects as in those figures.

Further details, benefits and features of the present invention will become available from the following description when taken in connection with the accompanying drawings.

What is claimed is:

1. A device for dividing a non-Newtonian liquid material flowing through a passage, the material having a flow-conditioned viscosity decreasing outward in cross-section in flow through a substantially T-shaped passage branching deflecting and dividing the liquid flow, comprising a partition member positioned in a partition plug member adjacent the end of the supply passage in the passage branching which divides the liquid flowing counter from the supply passage segment into two halves, said partition member positioned in a dome-shaped recess in said partition plug member, the angular position of the partition member having a setting adapted to the distribution of the differentially viscous components of the liquid in the supply passage segment, wherein the liquid flowing into the said discharge passages does not have substantial distribution of the differentially viscous components of the liquid.

2. The device according to claim 1 wherein the partition plug member is positioned in a bore in the passage branching.

3. The device according to claims 2 wherein to secure the lengthwise position of the partition plug member, a screw plug member is secured in the bore at the back of the partition plug member.

4. A device for dividing a non-Newtonian liquid material flowing through a passage, the liquid material having a flow-conditioned viscosity decreasing outward in cross section in flow through a substantially T-shaped passage branching deflecting and dividing the flow of liquid, comprising a deflector member positioned in said passage branching for dividing the central (viscous) component of the liquid material from the supply passage segment prior to its deflection into the discharge passages into two components, said two components being deflected in the region ahead of the discharge passages, said deflector member having a cylindrical first portion with a blade member extending therefrom, said blade member having a constriction portion forming a web and then an enlarged portion with convex curve portions on its sides, wherein the liquid flowing into the discharge passages does not have substantially asymmetrical distribution of the differentially viscous components of the liquid.

5. The device according to claim 4, wherein the flow directions of the two components flowing towards each other run substantially perpendicular to the longitudinal axes of the discharge passages.

6. The device according to claim 5, wherein the deflector member projects into the end of the supply passage and beginning from the blade member, at first widens perpendicular to the latter and then narrows again.

7. The device according to claim 4, wherein the deflector member projects into the end of the supply passage and beginning from the blade member, at first widens perpendicular to the latter and then narrows again.

8. The device according to claim 7, wherein the deflector member is positioned to not contact the wall of the supply passage segment.

9. The device according claim 4 wherein said deflector member is insertable and fastenable in the bottom of the passage branching from without through a bore in the bottom thereof.

\* \* \* \* \*